United States Patent [19]
Suzuki et al.

[11] Patent Number: 5,355,714
[45] Date of Patent: Oct. 18, 1994

[54] PRESSURE SENSOR USING A PRESSURE RESPONSIVE MAGNETIC FILM TO VARY INDUCTANCE OF A COIL

[75] Inventors: Masaru Suzuki, Kariya; Fumiaki Murakami, Okazaki; Yoshihisa Nakano, Nagoya; Hideki Miyazawa, Kariya, all of Japan

[73] Assignee: Nippondenso Co., Ltd., Kariya, Japan

[21] Appl. No.: 22,633

[22] Filed: Feb. 25, 1993

[30] Foreign Application Priority Data

Feb. 26, 1992 [JP] Japan .................. 4-038996

[51] Int. Cl.$^5$ ............................................. B60C 23/02
[52] U.S. Cl. .................. 73/146.5; 73/708; 73/728; 336/30
[58] Field of Search ............ 73/146.5, 146.8, 728, 73/722, 708; 336/30, 134; 361/282; 379/143

[56] References Cited

U.S. PATENT DOCUMENTS

| | | | |
|---|---|---|---|
| 1,718,494 | 6/1929 | Schurig | 336/30 |
| 4,412,454 | 11/1983 | Yamashita et al. | |
| 4,662,226 | 5/1987 | Wang | 73/728 |

FOREIGN PATENT DOCUMENTS

| | | |
|---|---|---|
| 54-124771 | 9/1979 | Japan . |
| 60-80327 | 6/1985 | Japan . |
| 61-141098 | 6/1986 | Japan . |
| 426244 | 6/1992 | Japan . |
| 1652838 | 5/1991 | U.S.S.R. ................ 73/722 |

*Primary Examiner*—Richard E. Chilcot, Jr.
*Assistant Examiner*—Joseph L. Felber
*Attorney, Agent, or Firm*—Cushman, Darby & Cushman

[57] ABSTRACT

A pressure sensor includes a diaphragm having a magnetic film fixed to one side thereof. The diaphragm is arranged to displace depending on a pressure differential applied thereacross to change an inductance of a coil which is arranged close to the magnetic film with a predetermined gap therebetween. An alternating current is supplied to the coil to be modulated by the inductance of the coil so that the pressure differential across the diaphragm is converted into an electric signal. A monitored pressure is derived based on this converted electric signal.

22 Claims, 10 Drawing Sheets

PRESSURE SENSOR USING A PRESSURE RESPONSIVE MAGNETIC FILM TO VARY INDUCTANCE OF A COIL

BACKGROUND OF THE INVENTION

1. Field of the Invention

The present invention relates to a pressure sensor for monitoring, such as, an air pressure in a tire of an automotive vehicle.

2. Description of the Prior Art

According to one type of a conventional pressure sensor as disclosed, such as, in Japanese First (unexamined) Patent Publication No. 54-124771, a piezoelectric element is used for monitoring a pressure variation. Specifically, the piezoelectric element is arranged to vary its electrical capacitance depending on a pressure applied thereto from a diaphragm or bellows which is arranged to displace according to a pressure differential applied thereacross. This variation of the electrical capacitance of the piezoelectric element is converted to an electric signal so as to electrically detect the monitored pressure variation.

Another type of the pressure sensor has been proposed which utilizes a piezoresistant element mounted on a diaphragm so as to detect a pressure variation as a variation of an electric resistance of the piezoresistant element.

In the former conventional pressure sensor, however, the material characteristic of the piezoelectric element is an essential factor for determining the pressure-capacitance characteristic thereof, i.e. the detection sensitivity of the pressure sensor. As a result, there has been a problem in that uneven individual characteristics or qualities of manufactured piezoelectric elements cause uneven detection sensitivities of the pressure sensors, leading to measurement errors in pressure.

Similarly, this problem also applies to the latter conventional pressure sensor, wherein the material characteristic of the piezoresistant element is an essential factor for determining the measurement precision or accuracy of the pressure sensor.

SUMMARY OF THE INVENTION

Therefore, it is an object of the present invention to provide an improved pressure sensor that can eliminate the above-noted defects inherent in conventional pressure sensors.

To accomplish the above-mentioned and other objects, according to one aspect of the present invention, in a pressure sensor having a case, a diaphragm supported by the case at its outer peripheral portion and arranged to displace depending on a pressure differential between two fluids acting on opposite sides thereof, and conversion means for converting the displacement of the diaphragm into an electric signal, the conversion means comprises a magnetic film provided on the diaphragm; a coil disposed close to the magnetic film with a predetermined gap therebetween, the coil changing its inductance depending on a variation in the magnitude of the gap, the gap variation caused by the displacement of the diaphragm; and circuit means for feeding a signal in the form of an alternating current to the coil to detect a signal component which has been modulated by the inductance.

According to another aspect of the present invention, a pressure sensor for measuring a monitored pressure comprises a case; a diaphragm supported by the case, the diaphragm arranged to displace depending on a pressure differential applied thereacross; a magnetic film provided on the diaphragm; a coil disposed close to the magnetic film with a predetermined gap therebetween, the coil changing its inductance depending on a variation in magnitude of the gap, the gap variation caused by the displacement of the diaphragm; a resonant circuit including the coil therein, the resonant circuit changing a resonance frequency thereof depending on the inductance of the coil; and circuit means for feeding a signal in the form of an alternating current to the resonant circuit to detect a signal component which has been affected due to the variation of the resonance frequency of the resonant circuit, the circuit means deriving the monitored pressure based on the detected signal component.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to the present invention.

In the drawings.

DESCRIPTION OF THE PREFERRED EMBODIMENT

Figure 1:
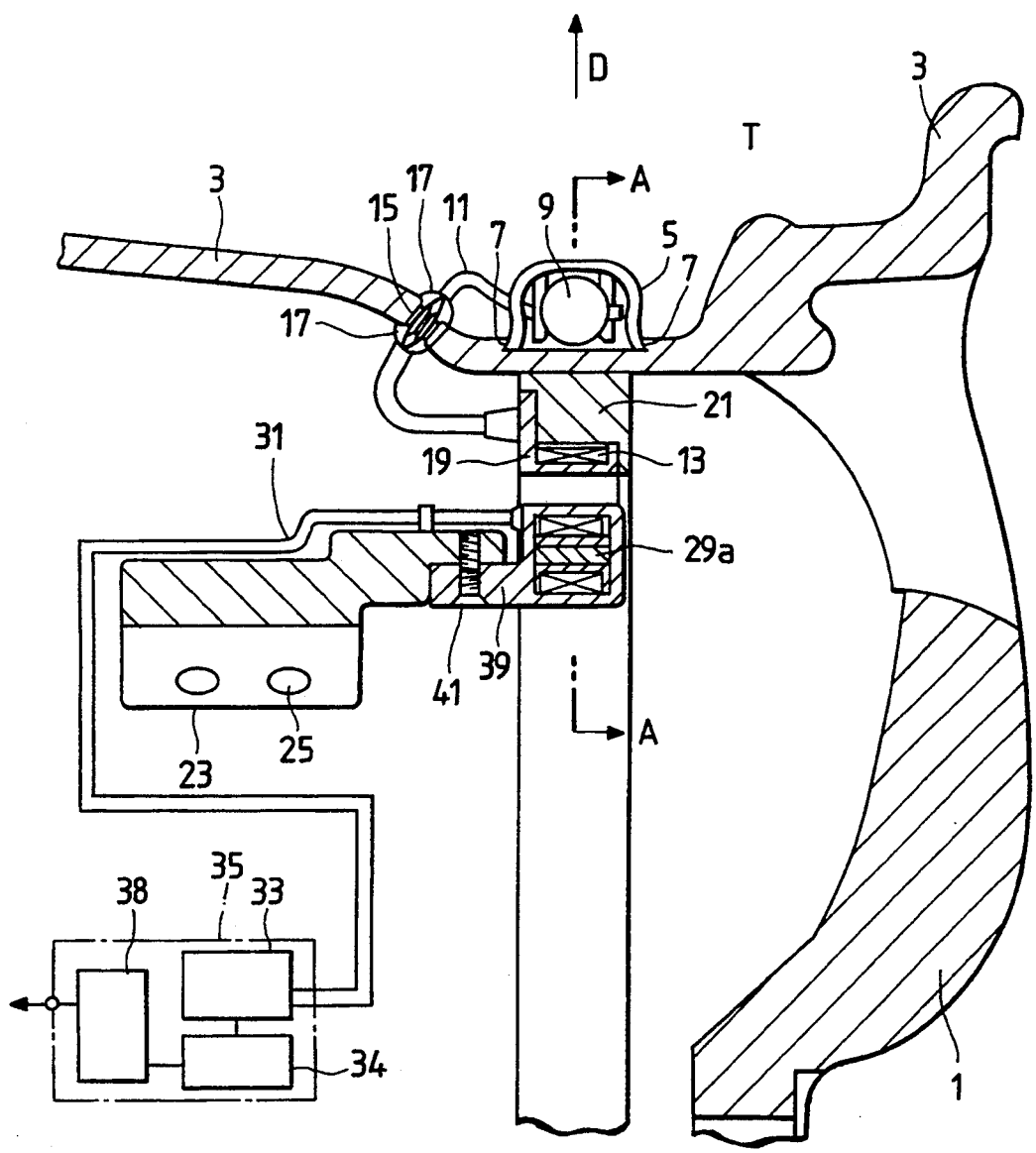
FIG. 1 is a schematic sectional view showing an entire system for monitoring tire condition indicative parameters, according to a preferred embodiment of the present invention.

Referring now to the drawings, FIG. 1 shows the entire structure of a vehicular tire monitoring system incorporating a pressure sensor therein, according to a preferred embodiment of the present invention.

Figure 3:
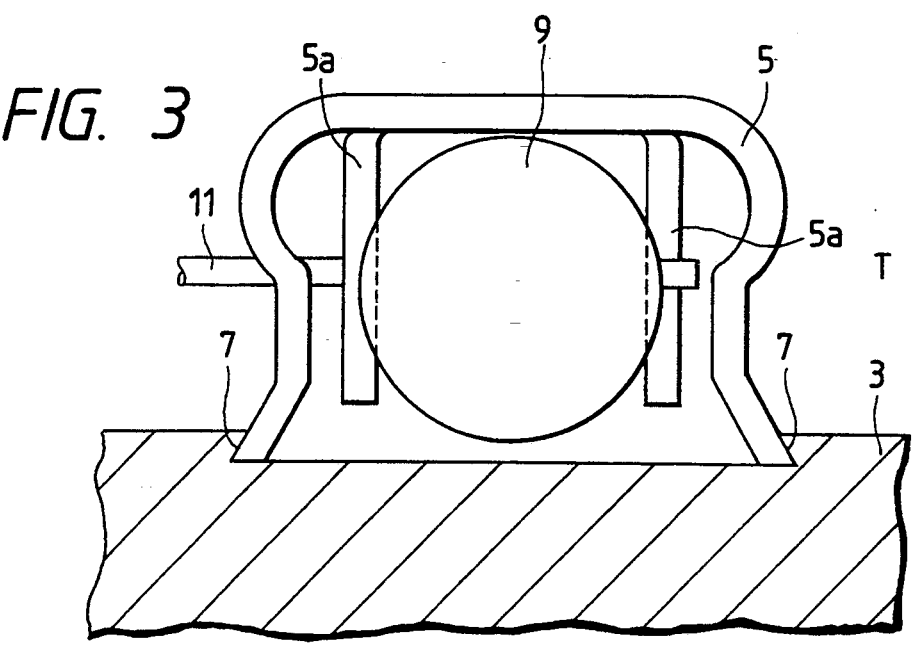
FIG. 3 is a schematic view showing an assembling manner of a pressure-temperature sensing section, according to the preferred embodiment of the present invention.

In FIG. 1, a reference numeral 1 denotes a tire wheel to which a wheel rim 3 is joined. A case 5 is made of an elastic material, such as, beryllium copper, and is firmly fitted at its opposite ends into a cut-out portion 7 of the rim 3 inside a vehicular tire T, as best shown in FIG. 3, by means of an elastic force of the elastic material forming the case 5. As alternatives, it may be possible to fix the case 5 to the cut-out portion 7 by welding or bonding. A pressure-temperature sensing section 9 is fixed to the case 5 and in a non-contact relationship to the rim 3, as best shown in FIG. 3. Terminals of the pressure-temperature sensing section 9 are electrically connected to a coil 13 via a lead wire or a cable 11, the coil 13 being arranged at a side of the rim 3.

An electrically insulating member 15 made of, such as, glass includes therein a pair of conductor lines, and is fixed in the rim 3. After the cable 11 is connected to the included conductor lines, the insulating member 15 is sealed by a rubber seal 17.

The coil 13 is wound around a cylindrical bobbin 19 having a pair of annular flanges. The bobbin 19 is fixed at an inner circumferential wall of a bobbin mounting stay 21 by means of its annular flanges fixed to inner stepped surfaces of the bobbin mounting stay 21. An outer periphery of the bobbin mounting stay 21 is, in turn, fixed to an inner circumferential wall of the rim 3 by welding or bonding.

A coil mounting stay 23 is fixedly arranged at a side of a vehicular body (not shown) by means of mounting holes 25 and bolts (not shown) screwed thereinto. The coil mounting stay 23 extends close to an inner circumferential wall of the bobbin 19, where a case 39 of a non-magnetic material, such as, aluminum is fixed to the coil mounting stay 23 by bolts 41.

Figure 2:
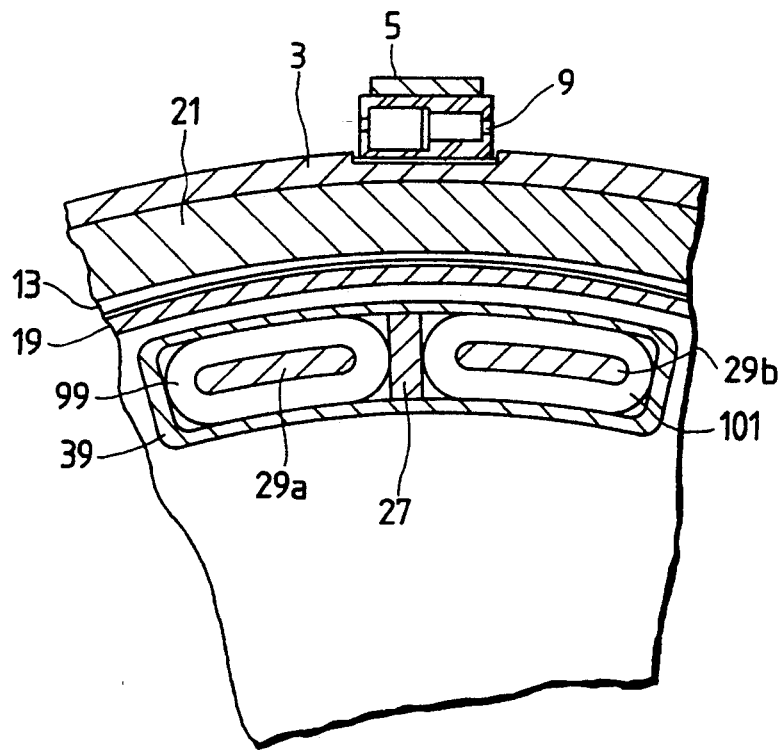
FIG. 2 is a sectional view taken along a line A—A in FIG. 1.

As best shown in FIG. 2, the case 39 includes therein an exciting coil 99 wound around an iron core 29a and a receiving coil 101 wound around an iron core 29b. A separator 27 of a non-magnetic material is interposed between the coils 99 and 101 for partitioning them. Both ends of the coils 99 and 101 are respectively connected to an electronic control unit (hereinafter referred to as "ECU") 35 via a lead wire or a cable 31 (FIG. 1).

Figure 4:
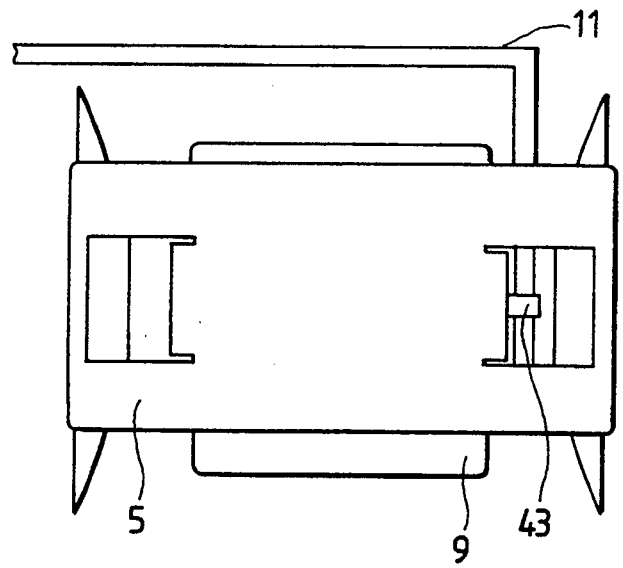
FIG. 4 is a schematic plan view of FIG. 3.

In FIGS. 3 and 4, the case 5 includes a pair of leg portions 5a which engage with the pressure-temperature sensing section 9 to firmly hold it therebetween. Each of the leg portions 5a are formed by lacing and bending a portion of the case 5. A reference numeral 43 denotes a harness for fixing the cable 11.

Figure 5:
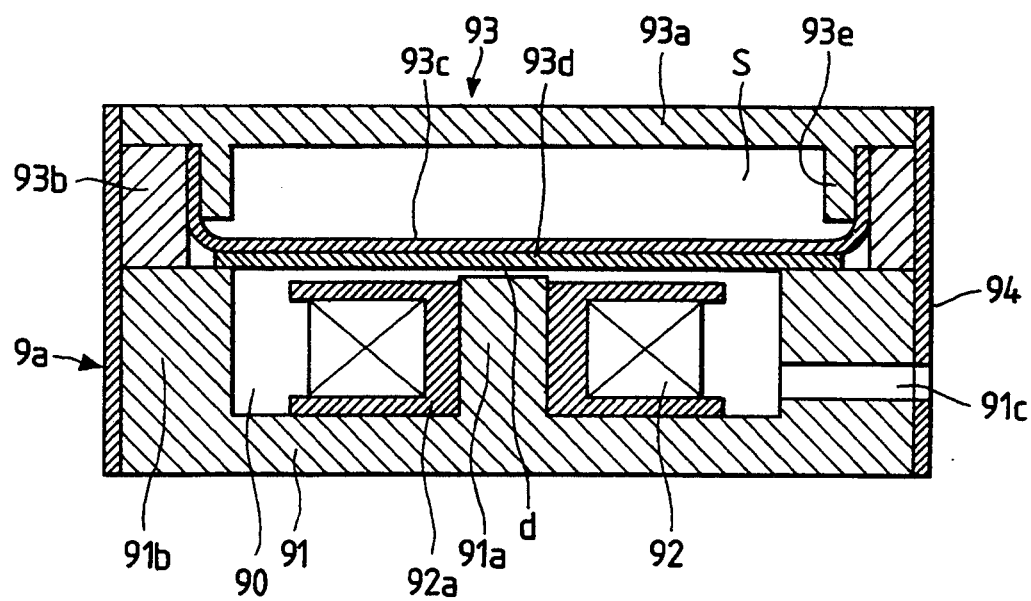
FIG. 5 is a sectional view showing a structure of a pressure sensing section of the pressure-temperature sensing section.
Figure 6:
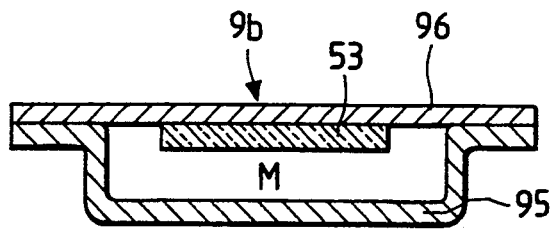
FIG. 6 is a sectional view showing a structure of a temperature sensing section of the pressure-temperature sensing section.
Figure 7:
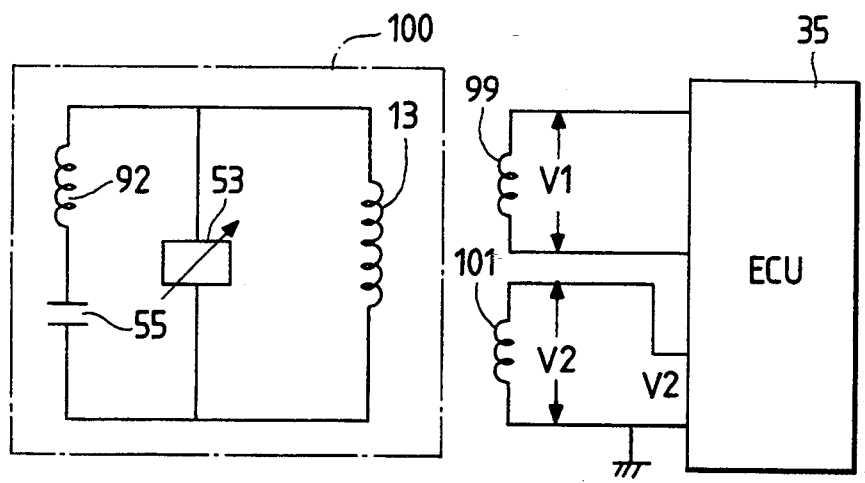
FIG. 7 is a circuit diagram for deriving a tire pressure and a tire temperature, according to the preferred embodiment of the present invention.

Referring now to FIGS. 5 to 7, the pressure-temperature sensing section 9 will be described hereinbelow. The pressure-temperature sensing section 9 comprises a pressure sensing section 9a (FIG. 5), a temperature sensing section 9b (FIG. 6) and a series capacitor 55 (FIG. 7).

In FIG. 5, the pressure sensing section 9a includes a disc-shaped ferrite core 91 formed at its upper surface with an annular recess 90, a coil 92 received in the annular recess 90 and a disc-shaped hollow diaphragm section 93 which is disposed on the ferrite core 91. The ferrite core 91 and the diaphragm section 93 are firmly fitted into a cylindrical case 94 which is open at its both ends.

The ferrite core 91 is formed with a center post 91a which defines an inner periphery of the annular recess 90, and an outer annular section 91b which defines an outer periphery of the annular recess 90. A resinous bobbin 92a having the coil 92 therearound is firmly fitted around the center post 91a. A communication passage 91c is formed through the outer annular section 91b and the case 94 so as to provide a fluid communication between the annular recess 90 and the outside thereof, i.e. the inside of the vehicular tire.

The diaphragm section 93 includes a disc-shaped base 93a, a ring member 93b, a dish-shaped diaphragm 93c and a thin magnetic film 93d bonded to a lower surface of the diaphragm 93c. The base 93a is formed at its outer peripheral side with an annular section 93e extending downward. On the other hand, the diaphragm 93c includes an upright wall at a peripheral edge of its planar section. The upright wall of the diaphragm 93c is fitted around the annular section 93e of the base 93a and thereafter fixed by welding so as to provide a hermetically sealed space or chamber S within the diaphragm section 93.

As shown in FIG. 5, the magnetic film 93d is located at its lower center close to an upper end of the center post 91a of the ferrite core 91 to form a gap d therebetween. On the other hand, the magnetic film 93d is at its peripheral edge in contact with an upper end of the outer annular section 91b of the ferrite core 91, in this embodiment.

The ring member 93b is firmly fitted around the upright section of the diaphragm 93c with its upper end contacting with the lower surface of the base 93a and with its lower end contacting with the upper end of the outer annular section 91b of the ferrite core 91. Accordingly, the ring member 93b determines a magnitude of the gap d between the ferrite core 91 and the magnetic film 93d. Obviously, the magnitude of the gap d is variably set by replacing the ring member 93b.

In this embodiment, the magnetic film 93d is an amorphous film having a thickness of about 0.03 mm. This, however, may be replaced by a magnetic tape coated with iron oxide particles, a ferrite (pure iron) plate, a silicon steel sheet or the like. Further, the magnetic film 93d may be provided on the diaphragm 93c by vapor deposition, using such techniques as chemical vapor deposition (CVD) and physical vapor deposition (PVD), painting or the like, other than by bonding as in this embodiment. It is preferable, however, to form the magnetic film 93d by a soft-magnetic material of a high permeability having a small permanent magnetization and a small magnetostriction coefficient. On the other hand, the base 93a, the ring member 93b and the diaphragm 93c are respectively made of a non-magnetic material, such as, a stainless steel.

It is to be appreciated that the diaphragm 93c may be at least partly made of a magnetic material so as to double as a magnetic film. In this case, the bonding of the magnetic film 93d is omitted. Further, the magnetic film 93d may have various shapes, such as, a linear shape other than a disc shape as in this embodiment. Still further, the ferrite core 91 may be omitted.

The pressure sensing section 9a operates in the following manner:

When an air pressure in the vehicular tire varies, a pressure differential between a gas pressure in the hermetically sealed chamber S and the pressure in the tire varies. This variation of the pressure differential displaces the diaphragm 93c in an up-down or vertical direction in FIG. 5 to change the magnitude of the gap d. As a result, an inductance L of the coil 92 is changed. This variation of the inductance L is derived as an AC electric signal by feeding an alternating current (AC) to the coil 92. In this case, a smaller current magnitude is preferable in view of a magnetic saturation of the magnetic film 93d and heating of the coil 92 and the ferrite core 91 and further in view of the electric power to be consumed.

Figure 12:
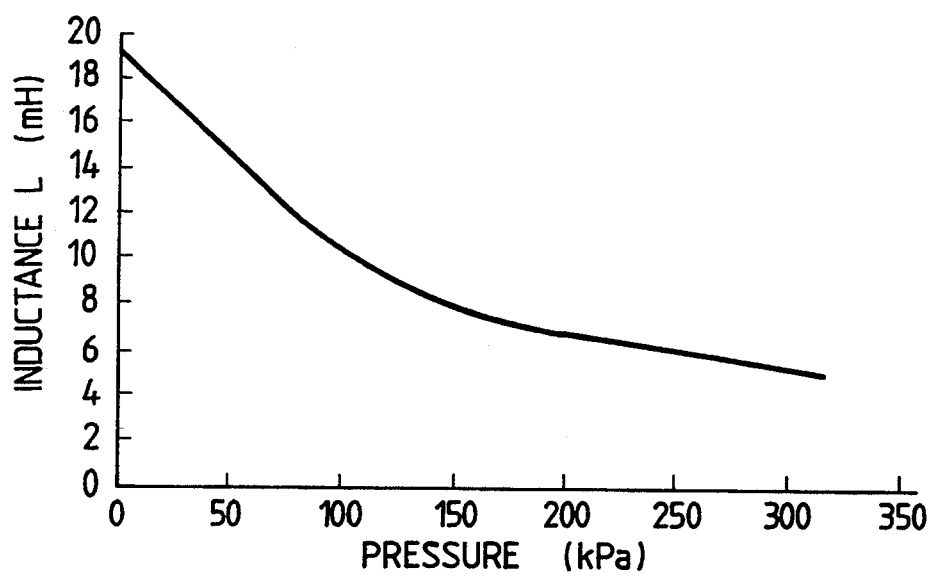
FIG. 12 is a characteristic map showing an observed relationship between applied tire pressure and inductance of a coil, according to the preferred embodiment of the present invention.
Figure 13:
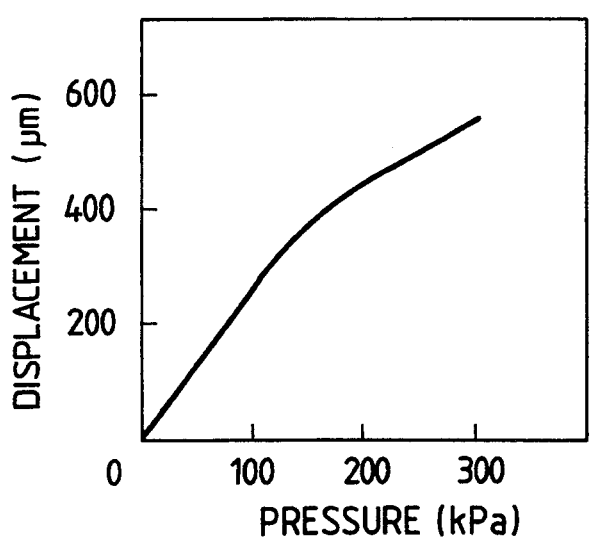
FIG. 13 is a characteristic map showing an observed relationship between an applied tire pressure and displacement of a diaphragm, according to the preferred embodiment of the present invention.

FIG. 12 shows a characteristic graph of a relationship between an applied tire pressure and an inductance L of the coil 92. FIG. 13 also shows a characteristic graph of a relationship between an applied tire pressure and a displacement in a gap direction of the diaphragm 93c. These relationships are observed through experiments using a pressure sensor of the same structure as the pressure sensing section 9a.

Referring now to FIG. 6, the temperature sensing section 9b includes a dish-shaped metallic case 95, a cover plate 96 which seals an open end of the case 95 to form a hermetically sealed chamber or space M inside the case 95, and a piezoelectric capacitor 53 fixed to the cover plate 96 with an insulating film (not shown) interposed therebetween. The piezoelectric capacitor 53 changes its electrical capacitance depending on applied pressure and temperature. In this embodiment, however, since the piezoelectric capacitor 53 is disposed in the hermetically sealed chamber M, the piezoelectric capacitor 53 changes its electrical capacitance only depending on the temperature in the vehicular tire. The piezoelectric capacitor 53 is a complex impedance component made of a barium titanate based compound. However, since an admittance component is large in the piezoelectric capacitor 53 at a frequency band employed in this embodiment, the piezoelectric capacitor 53 can simply be considered as a capacitor.

FIG. 7 shows an entire circuit, including the coil 92 of the pressure sensing section 9a and the piezoelectric capacitor 53 of the temperature sensing section 9b, for monitoring the pressure and temperature variations in the vehicular tire.

In this circuit, the coil 92, the piezoelectric capacitor 53 and the series capacitor 55 of the pressure-temperature sensing section 9 constitute a resonant circuit 100 cooperatively with the coil 13. Specifically, the coil 92 and the series capacitor 55 are connected in series to each other to form an LC series circuit section which is connected to both ends of the coil 13, and the piezoelectric capacitor 53 is further connected to the ends of the coil 13 in parallel with the LC series circuit section.

The resonant circuit 100 has two resonance frequencies, i.e. the first resonance frequency f1 and the second resonance frequency f2 which are respectively defined by the following equations:

$$f1 = (A/2L_1L_2C_1C_2)^{\frac{1}{2}}/2\pi$$

$$A = \{(L_2C_2 - (C_1 + C_2)L_1)^2 + 4L_1L_2C_2^2\}^{\frac{1}{2}} + L_2C_2 + (C_1 + C_2)L_1$$

$$f2 = (B/2L_1L_2C_1C_2)^{\frac{1}{2}}/2\pi$$

$$B = -\{(L_2C_2 - (C_1 + C_2)L_1)^2 + 4L_1L_2C_2^2\}^{\frac{1}{2}} + L_2C_2 + (C_1 + C_2)L_1$$

In the equations, $L_1$ represents an inductance of the coil 13, $L_2$ represents an inductance of the coil 92, $C_1$ represents an electrical capacitance of the piezoelectric capacitor 53, and $C_2$ represents an electrical capacitance of the series capacitor 55.

As seen from the equations, the first and second resonance frequencies f1 and f2 are respectively functions of the impedance components $L_1$, $L_2$, $C_1$ and $C_2$. Accordingly, if two of the four impedance components are selected as variables which vary depending on tire condition indicative parameters, the selected two variables can be derived based on tile equations by detecting the first and second resonance frequencies f1 and f2 of the resonant circuit 100. As described above, in this embodiment, $C_1$ is selected as a variable relative to the tire temperature and $L_2$ is selected as another variable relative to the tire pressure. The tire temperature and the tire pressure can be derived based on derived $C_1$ and $L_2$, respectively, such as by using corresponding stored maps.

An exciting coil 99 is fed with an alternating current, variable in frequency, from the ECU 35, which is then supplied to the resonant circuit 100 through a non-contact electromagnetic coupling between the exciting coil 99 and the coil 13 of the resonant circuit 100. On the other hand, an alternating current is induced at a receiving coil 101 through a non-contact electromagnetic coupling between tile coil 13 and the receiving coil 101.

Figure 8:
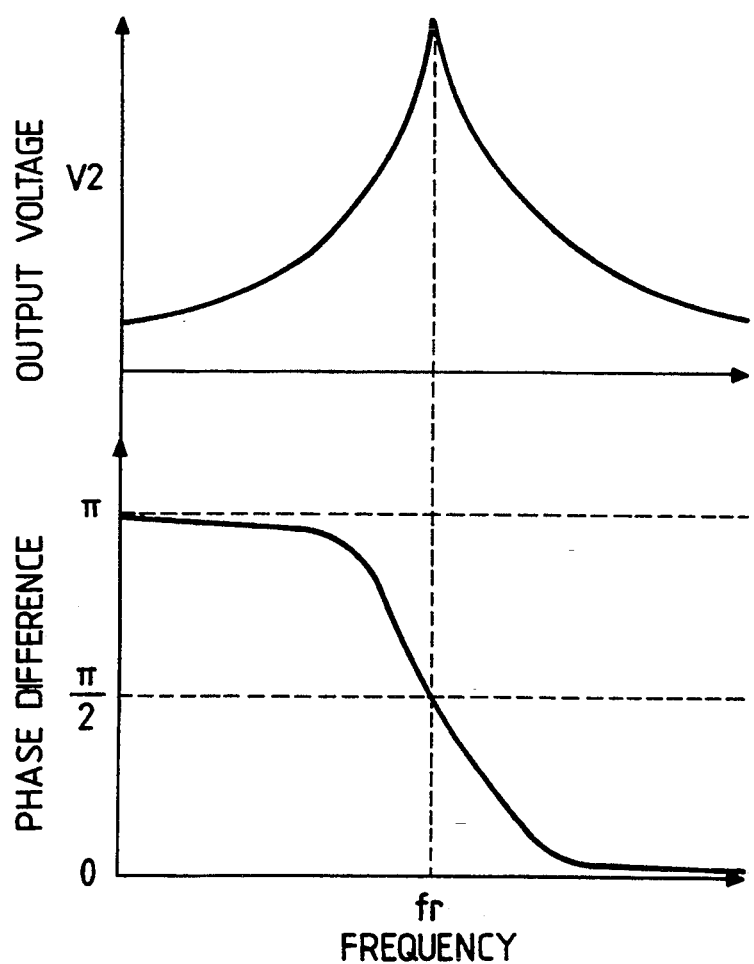
FIG. 8 is a graph showing a relationship between output voltage and frequency and between phase difference and frequency, in a resonant circuit.

In the resonant circuit 100, it is known that, when a frequency of an exciting voltage V1 applied to the exciting coil 99 is equal to a resonance frequency fr of tile resonant circuit 100, a phase difference between the exciting voltage V1 and a voltage V2 induced across the receiving coil 101 becomes $\pi/2$, as shown in FIG. 8. Accordingly, by adjusting the frequency of the exciting voltage V1 to allow the phase difference between the exciting voltage V1 and the induced voltage V2 to be $\pi/2$, the resonance frequency fr is detected as being equal to the frequency of the induced voltage V2 at the time of the phase difference being $\pi/2$. Since the induced voltage V2 becomes maximum in magnitude when the resonant circuit 100 operates in the resonant condition, a signal-to-noise ratio (S/N) of the induced voltage V2 is increased so that the detection accuracy thereof is highly reliable. For simplifying the explanation, effects of the electromagnetic coupling between the exciting coil 99 and the receiving coil 101 are not taken into consideration herein.

Figure 9:
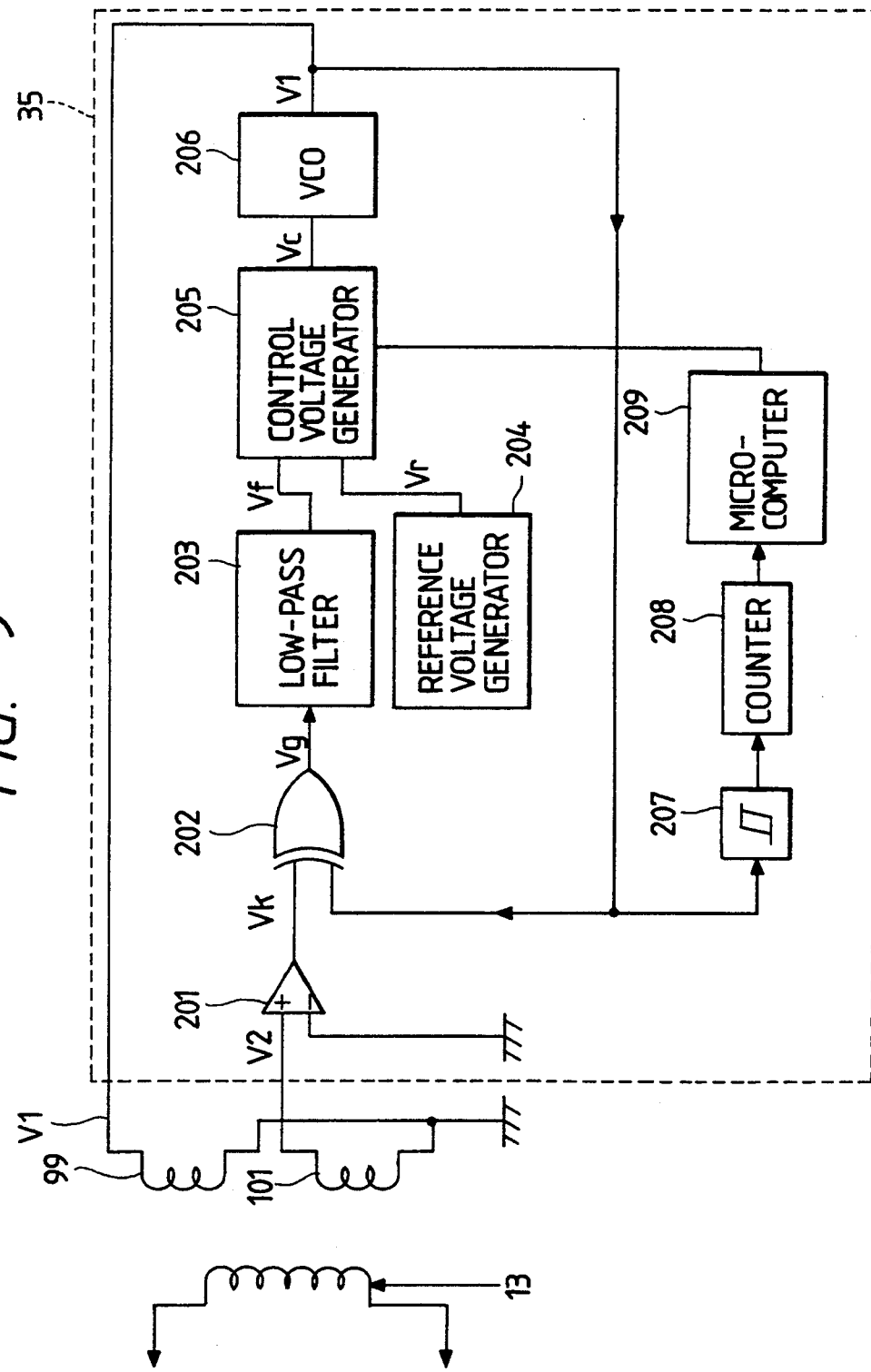
FIG. 9 is a block diagram showing a structure of an electronic control unit (ECU) according to the preferred embodiment of the present invention.
Figure 10:
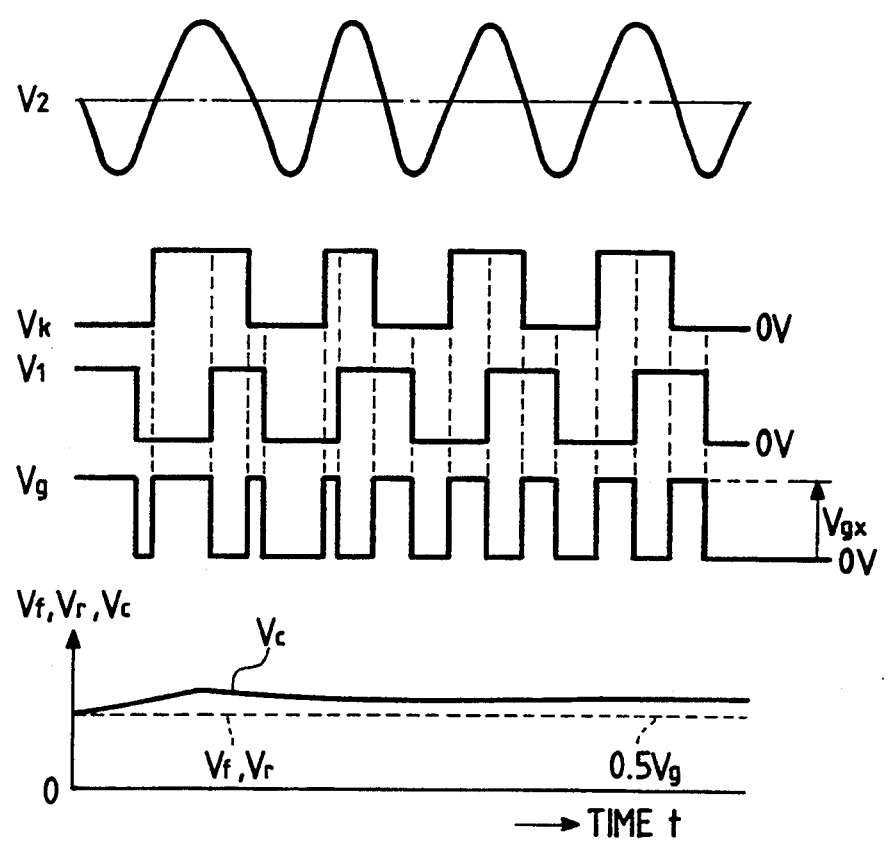
FIG. 10 is a diagram showing waveforms of voltage signals at relevant portions in the ECU.

FIG. 9 shows a structure of the ECU 35 as one example, and FIG. 10 shows waveforms at relevant circuit elements in the ECU 35.

A voltage controlled oscillator (hereinafter referred to as "VCO") 206 is designed to oscillate at a frequency band including the first and second resonance frequencies f1 and f2 of the resonant circuit 100. The output voltage V1 of the VCO 206 energizes the resonant circuit 100 through the electromagnetic coupling between the exciting coil 99 and the coil 13 of the resonant circuit 100. On the other hand, the induced voltage V2 in the form of a sine wave is generated across the receiving coil 101 by electromagnetic waves emitted from the coil 13 of the resonant circuit 100. The induced voltage V2 is input to a comparator 201 which converts the induced voltage V2 into a voltage signal Vk in the form of a rectangular wave having the same phase as the induced voltage V2. The voltage signal Vk is then input to an exclusive OR gate 202 which compares the voltage signal Vk with the output voltage V1 from the VCO 206 to output a voltage signal Vg. As shown in FIG. 10, the voltage signal Vg is at a low level when voltage levels of the signals Vk and V1 are equal, and at a high level when the voltage levels of the signals Vk and V1 are different. The voltage signal Vg is then fed to a low-pass filter 203 to be converted into a DC (direct current) voltage Vf which is variable in magnitude depending on a duty cycle of the voltage signal Vg. The DC voltage Vf is then input to a control voltage generator 205 to be compared with a reference voltage Vr from a reference voltage generator 204.

The control voltage generator 205 compares the DC voltage Vf with the reference voltage Vr to produce an error signal or a correction signal Vc indicative of a difference between the DC voltage Vf and the reference voltage Vr. Specifically, the control voltage generator 205 controls a magnitude of the correction signal Vc so as to bring the difference between the DC voltage Vf and the reference voltage Vr to a value of 0 (zero). The correction signal Vc is then fed to the VCO 206 which produces the output voltage V1 in the form of a rectangular wave having a frequency which is determined by a value of the correction signal Vc.

As appreciated, since the duty cycle of the voltage signal Vg becomes 0.5 when a phase difference between the voltage signal Vk from the comparator 201 and the output voltage V1 from the VCO 206 is $\pi/2$, a magnitude of the DC voltage Vf from the low-pass filter 203 under this condition becomes a half ($\frac{1}{2}$) of a crest or peak value Vgx of the voltage signal Vg. Accordingly, by setting a magnitude of the reference voltage Vr to a half ($\frac{1}{2}$) of the crest value Vgx of the voltage signal Vg, the frequency of the output voltage V1 from the VCO 206, which is determined by the value of the correction signal Vc which is controlled to eliminate the deviation between the DC voltage Vf and the reference voltage Vr, becomes and remains equal to the resonance frequency fr of the resonant circuit 100.

For detecting the first resonance frequency f1 of the resonant circuit 100, a microcomputer 209 outputs a first voltage Vc1 to the control voltage generator 205 which, in turn, outputs this first voltage Vc1 to the VCO 206 through an internal gate (not shown) irrespective of the input voltages Vr, Vf so that the VCO 206 produces the output voltage V1 having a frequency corresponding to the input first voltage Vc1. This first voltage Vc1 is set to a preselected value for allowing a frequency of the VCO 206 to be close to the first resonance frequency f1 of the resonant circuit 100. Under this condition, when the control voltage generator 205, by means of the internal gate, stops feeding the first voltage Vc1 to the VCO 206, and instead, stats feeding to the VCO 206 the output voltage Vc which is controlled to eliminate the voltage difference between the voltages Vf and Vr, the VCO 206 starts producing the output voltage V1 having a frequency equal to the first resonance frequency f1.

Similarly, for detecting the second resonance frequency f2 of the resonant circuit 100, the microcomputer 209 outputs a second voltage Vc2 to the control voltage generator 205 which, in turn, outputs this second voltage Vc2 to the VCO 206 through the internal gate irrespective of the input voltages Vr, Vf so that the VCO 206 produces the output voltage V1 having a frequency corresponding to the input second voltage Vc2. This second voltage Vc2 is set to a preselected value for allowing a frequency of the output voltage V1 to be close to the second resonance frequency f2 of the resonant circuit 100. Under this condition, when the control voltage generator 205, by means of the internal gate, stops feeding the second voltage Vc2 to the VCO 206, and instead, starts feeding to the VCO 206 the output voltage Vc which is controlled to eliminate the voltage difference between the voltages Vf and Vr, the VCO starts producing the output voltage V1 having a frequency equal to the second resonance frequency f2.

Now, a derivation of the inductance $L_2$ of the coil 92 and the capacitance $C_1$ of the piezoelectric capacitor 53 based on the first and second resonance frequencies f1 and f2 will be explained hereinbelow. As described before, the inductance $L_2$ represents the tire pressure and the capacitance $C_1$ represents the tire temperature.

As seen in FIG. 9, the output voltage V1 from the VCO 206 is pulse-shaped through a Schmitt trigger 207 and is then input to a counter 208 to be counted. A counter value is fed to the microcomputer 209 with proper timing.

Figure 11:
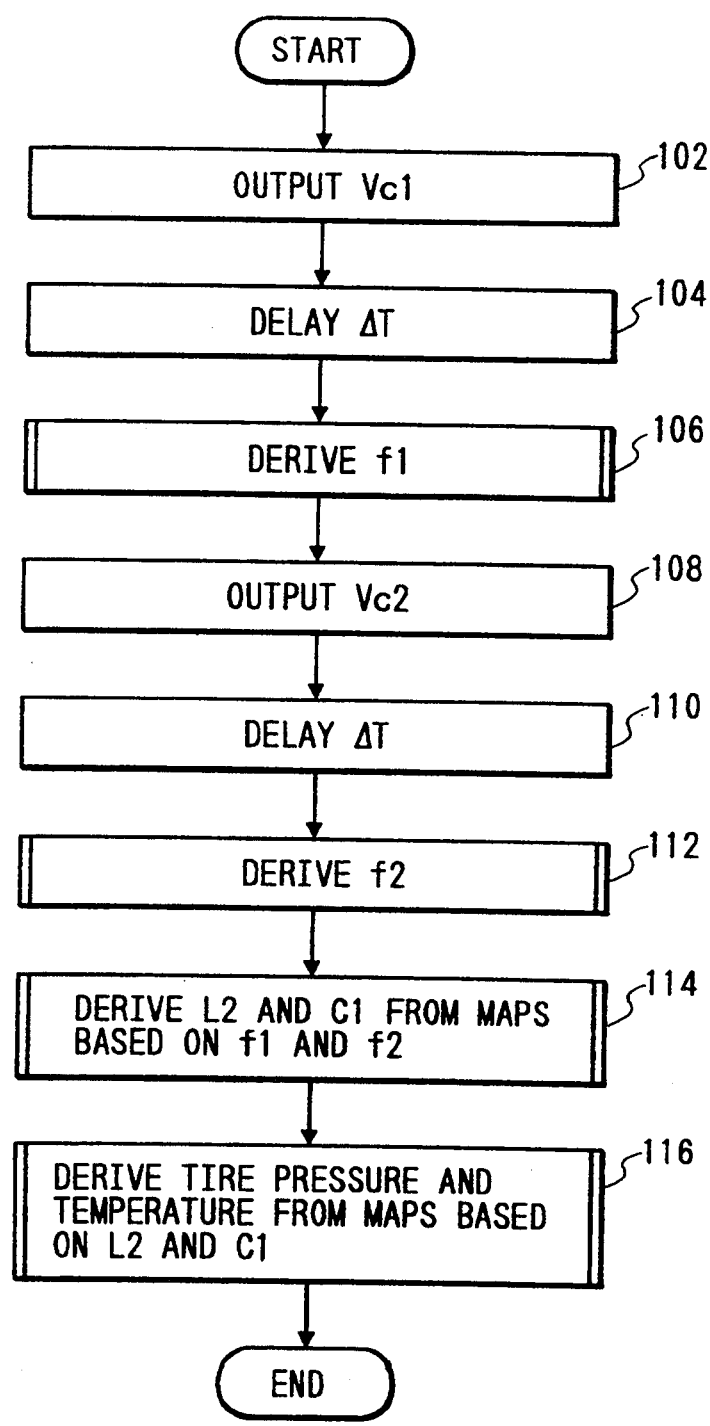
FIG. 11 is a flowchart to be executed by a microcomputer in the ECU for deriving a monitored tire pressure and a monitored tire temperature.

FIG. 11 shows a flowchart to be executed by the microcomputer 209 for deriving the monitored tire pressure and the monitored tire temperature.

At a first step 102, the microcomputer 209 outputs the first voltage Vc1 to the control voltage generator 205. Subsequently, at a step 104, the microcomputer 9-09 waits for a predetermined time $\Delta T$ until the VCO 206 oscillates at the first resonance frequency f1. As described above, the VCO 206, in response to the first voltage Vc1 fed from the control voltage generator 205, first oscillates at the frequency corresponding to the first voltage Vc1 and thereafter oscillates at the first resonance frequency f1. Accordingly, the microcomputer 209 should wait for the preset time $\Delta T$ at the step 104.

Subsequently, at a step 106, the first resonance frequency f1 is derived based on outputs from the counter 208. Specifically, the microcomputer 209 reads out a counter value C1 and a counter value C2 with a predetermined time lag and calculates a difference "C2−C1".

At a step 108, the microcomputer 209 outputs the second voltage Vc2 to the control voltage generator 205. Subsequently, at a step 110, the microcomputer 209 waits for the predetermined time $\Delta T$ until the VCO 206 oscillates at the second resonance frequency f2. As described above, the VCO 206, in response to the second voltage Vc2 fed from the control voltage generator 205, first oscillates at the frequency corresponding to the second voltage Vc2 and thereafter oscillates at the second resonance frequency f2. Accordingly, the microcomputer 209 should wait for the preset time $\Delta T$ at the step 110 as it did at the step 104.

Subsequently, at a step 112, the second resonance frequency f2 is derived based on outputs from the counter 208 in a manner similar to that at the step 106.

Thereafter, at a step 114, the microcomputer derives the pressure indicative inductance $L_2$ and the temperature indicative capacitance $C_1$ based on the derived first and second resonance frequencies f1 and f2, using corresponding stored maps. At a subsequent step 116, the microcomputer 209 derives the monitored tire pressure and the monitored tire temperature based on the derived inductance $L_2$ and capacitance $C_1$, using corresponding stored maps.

Referring back to FIG. 7, assuming that the piezoelectric capacitor 53 is omitted, the circuit of FIG. 7 operates only as a so-called pressure sensor. In this case, as being obvious from the foregoing description, the tire pressure can easily be derived in a manner similar to what is described above.

As understood from the foregoing description, the pressure sensor of the present invention not only covers such a pressure sensor as having a sole function of monitoring the pressure variation, but also covers such a pressure sensor as having combined functions of monitoring both the pressure variation and the temperature variation. Since the monitored pressure variation more or less relies on the monitored temperature variation, the pressure sensor having such combined functions can monitor the pressure variation on a more practical basis. In the foregoing embodiment, this can be performed using the single circuit as shown in FIG. 7.

Further, since the pressure sensing section 9a does not substantially include such an element a material characteristic of which raises a problem for the detection accuracy as in the foregoing conventional pressure sensor, a highly reliable detection accuracy of the monitored pressure variation is ensured. In addition, by adjusting a magnitude of the gap d between the magnetic film 93d and the ferrite core 91, tile detection sensitivity is easily adjusted.

Referring back to FIG. 6, assuming that the piezoelectric capacitor 53 is not disposed in the hermetically sealed chamber M as opposed to FIG. 6, i.e. the piezoelectric capacitor 53 is exposed to the tire pressure, tile tire pressure and the tire temperature can still be derived based on the first and second resonance frequencies f1 and f2, using the foregoing equations. In this case, the capacitance $C_1$ of the piezoelectric capacitor 53 is variable depending on both the tire pressure and the tire temperature.

Figure 14:
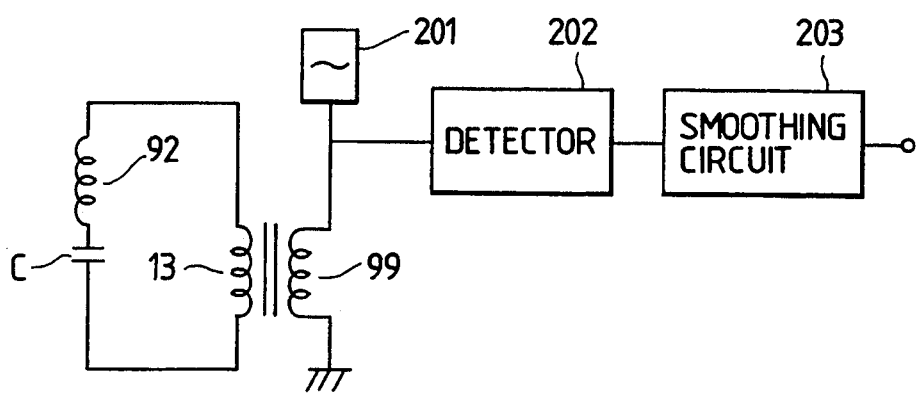
FIG. 14 is a circuit diagram showing a modification of the circuit diagram shown in FIG. 7.
Figure 15:
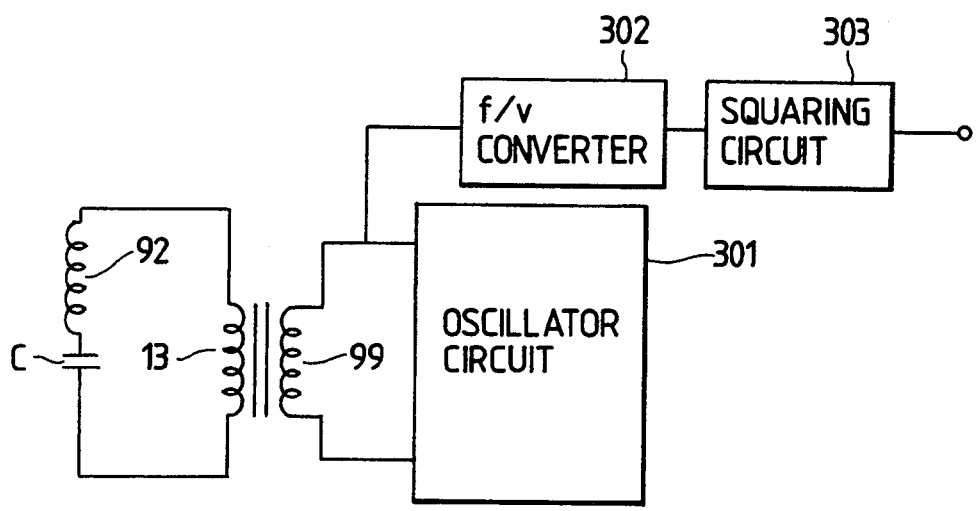
FIG. 15 is a circuit diagram showing another modification of the circuit diagram shown in FIG. 7.

FIGS. 14 and 15 respectively show modifications of the circuit of FIG. 7, wherein the piezoelectric capacitor 53 is omitted.

In FIG. 14, a series resonant circuit having the coil 92, the series capacitor having a constant capacitance C and the coil 13 is energized by a constant-frequency AC power source 201 having a given output impedance through an electromagnetic coupling between the coils 99 and 13. The frequency of the AC power source 201 is preset to a value close to a resonance frequency of the series resonant circuit. The resonance frequency of the series resonant circuit is variable depending on a variation of the inductance of the coil 92 due to a tire pressure variation. Since a voltage input to a detector 202 increases as the resonance frequency deviates from the power source frequency, an output voltage from a smoothing circuit 203 is a function of a tire pressure variation so that the monitored tire pressure can be derived based on the output voltage from the smoothing circuit 203.

In FIG. 15, an oscillator circuit 301 is designed to change its output frequency depending on a series impedance of the inductance of the coil 92 and the capacitance of the capacitor C. Accordingly, when the output frequency of the oscillator circuit 301 is frequency-to-voltage converted through a frequency-to-voltage converter 302 and is then squared through a squaring circuit 303, an output voltage from the squaring circuit 303 is a function of a tire pressure variation, which provides a high linearity between the output voltage from the squaring circuit 303 and the monitored tire pressure.

Figure 16:
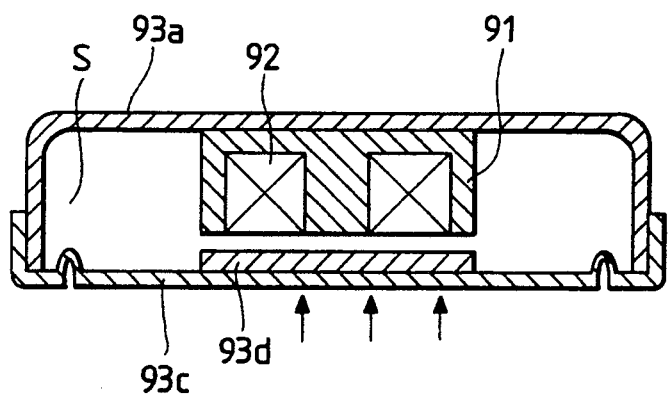
FIG. 16 is a sectional view showing a modification of the pressure sensing section shown in FIG. 5.

FIG. 16 shows a modification of the pressure sensing section 9a in FIG. 5, wherein the ferrite core 91, the coil 92 and the magnetic film 93d are disposed in the hermetically sealed chamber S. The magnetic film 93d is fixed to the diaphragm 93c at a side facing the hermetically sealed chamber S, and the tire pressure is applied to the diaphragm 93c at an opposite side as indicated by arrows. In FIG. 16, the same references as those in FIG. 5 respectively denote elements the same as or similar to those in FIG. 5.

Figure 17:
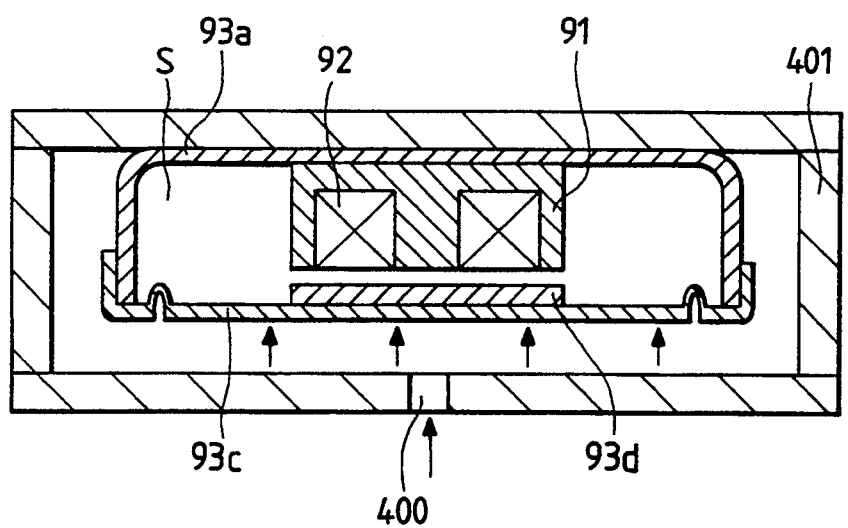
FIG. 17 is a sectional view showing a further modification of the pressure sensing section shown in FIG. 5, wherein the pressure sensing section shown in FIG. 16 is received in a non-magnetic box.

FIG. 17 shows an example, wherein the pressure sensing section in FIG. 16 is disposed in a box 401 having relatively thick walls which are made of a non-magnetic material, so as to prevent a variation of the external magnetic field from affecting the pressure sensing section. In FIG. 17, the tire pressure is applied to the diaphragm 93c through an opening 400 formed in the box 401 as indicated by arrows.

In a further modification of the pressure sensing section 9a in FIG. 5 or in FIG. 17, the hermetically sealed chamber S may be open to the atmospheric pressure. In this case, the diaphragm 93c displaces depending on a pressure differential between the tire pressure and the atmospheric pressure.

It is to be understood that this invention is not to be limited to the preferred embodiments and modifications described above, and that various changes and modifications may be made without departing from the spirit and scope of the invention as defined in the appended claims.

What is claimed is:

1. A pressure sensor comprising:
   a case;
   a diaphragm supported by said case at its outer peripheral portion and arranged to displace depending on a pressure differential between two fluids acting on opposite sides thereof; and
   conversion means for converting said displacement of said diaphragm into an electric signal, said conversion means comprising:
   a magnetic film provided on said diaphragm,
   a ferrite core having a center post and an outer peripheral annular section which cooperatively define therebetween an annular recess,
   a communication passage formed through said outer peripheral annular section for introducing a monitored pressure into said annular recess therethrough,
   a coil disposed in said annular recess of said ferrite core and close to said magnetic film with a predetermined gap therebetween, said coil changing into inductance depending on a variation in magnitude of said gap, said gap variation caused by said displacement of said diaphragm, and
   circuit means for feeding a signal in a form of an alternating current to said coil to detect a signal component which has been modulated by said inductance, wherein one opposite side of said diaphragm is exposed to a hermetically sealed chamber and another opposite side of said diaphragm is exposed to said monitored pressure.

2. The pressure sensor as set forth in claim 1, wherein said magnetic film is made of a material having a high magnetic permeability.

3. The pressure sensor as set forth in claim 1, wherein said diaphragm is made of a non-magnetic material.

4. The pressure sensor as set forth in claim 1, wherein said magnetic film forms a portion of the diaphragm.

5. The pressure sensor as set forth in claim 1, wherein the pressure sensor monitors a pressure in a vehicular tire.

6. The pressure sensor as set forth in claim 1, wherein said pressure differential is a balance between a pressure in a vehicular tire and a reference pressure.

7. The pressure sensor as set forth in claim 1, wherein said magnetic film is provided on said diaphragm at said another opposite side in confronting relationship to said coil which is exposed to said monitored pressure.

8. The pressure sensor as set forth in claim 1, further comprising a coil mounting member which is fitted around said center post of the ferrite core, said coil being wound around said coil mounting member.

9. A pressure sensor comprising:

a case;

a diaphragm supported by said case at its outer peripheral portion and arranged to displace depending on a pressure differential between two fluids acting on first and second opposite sides thereof; and conversion means for converting said displacement of said diaphragm into an electric signal, said conversion means comprising:

a magnetic film provided on said diaphragm, a coil disposed close to said magnetic film with a predetermined gap therebetween, said coil changing its inductance depending on a variation in magnitude of said gap, said gap variation caused by said displacement of said diaphragm, and circuit means for feeding a signal in a form of an alternating current to said coil to detect a signal component which has been modulated by said inductance, said coil forming a resonant circuit for detecting said modulated signal component, and said resonant circuit further including a capacitor connected in series to said coil.

10. The pressure sensor as set forth in claim 9, wherein said resonant circuit further includes a piezoelectric capacitor which changes its capacitance based on a temperature applied thereto, said piezoelectric capacitor being connected in parallel with said serially connected coil and capacitor in said resonant circuit.

11. The pressure sensor as set forth in claim 10, wherein said piezoelectric capacitor monitors the temperature in a vehicular tire.

12. The pressure sensor as set forth in claim 11, wherein said piezoelectric capacitor is disposed in a hermetically sealed chamber defined by a metallic case which is disposed in the vehicular tire.

13. The pressure sensor as set forth in claim 9, wherein:

one opposite side of said diaphragm is exposed to a hermetically sealed chamber and another opposite side of said diaphragm is exposed to a monitored pressure; and said magnetic film is provided on said diaphragm at said one opposite side in confronting relationship to said coil which is disposed in said hermetically sealed chamber.

14. The pressure sensor as set forth in claim 13, wherein said hermetically sealed chamber is defined by said diaphragm and a base member which are fixedly connected to each other to form a unit, said unit being received in a case of a non-magnetic material so as to prevent influence of an external magnetic field to said unit.

15. The pressure sensor as set forth in claim 14, wherein said monitored pressure is applied to the diaphragm at said another opposite side through a communication passage formed through said case.

16. A pressure sensor for measuring a tire pressure of a vehicle comprising:

a case;

a diaphragm supported by said case and having a magnetic property, said diaphragm arranged to displace depending on a pressure differential between the tire pressure and a reference pressure applied thereacross;

a coil disposed close to said diaphragm with a predetermined gap therebetween, said coil changing its inductance depending on a variation in magnitude of said gap, said gap variation caused by said displacement of the diaphragm;

a resonant circuit including said coil therein, said resonant circuit changing a resonance frequency thereof depending on said inductance of the coil, said resonant circuit including a capacitor which changes its capacitance based on a temperature applied thereto; and circuit means for feeding a signal in a form of an alternating current to said resonant circuit to detect a signal component which has been affected due to the variation of said resonance frequency of the resonant circuit, said circuit means deriving said tire pressure based on said detected signal component.

17. The pressure sensor ass set forth in claim 16, wherein said capacitor comprises a piezoelectric means and is connected in parallel relationship to said coil.

18. The pressure sensor as set forth in claim 17, wherein:

said resonant circuit includes a capacitor connected in series with said coil and in parallel with said piezoelectric means; and said piezoelectric means is responsive to a temperature of a vehicle tire.

19. A pressure sensor for measuring a tire pressure of a vehicle, comprising:

a case;

a displaceable member having means for showing a magnetic property, said displaceable member supported by said case and arranged to displace depending on a pressure differential between said tire pressure and a reference pressure applied thereacross;

a coil disposed close to said displaceable member with a predetermined gap between said coil and said means for showing the magnetic property, said coil changing its inductance depending on a variation in magnitude of said gap, said gap variation caused by said displacement of the displaceable member;

a resonant circuit including said coil therein, said resonant circuit changing a resonance frequency thereof depending on said inductance of the coil, said resonant circuit including a piezoelectric capacitor which changes its capacitance based on a temperature applied thereto, said piezoelectric capacitor being connected in parallel relation to said coil; and circuit means for feeding a signal in a form of an alternating current to said resonant circuit to detect a signal component which has been affected due to said variation of said resonance frequency of said resonant circuit, said circuit means deriving said tire pressure based on said detected signal component.

20. The pressure sensor as set forth in claim 19, wherein said displaceable member is a non-magnetic diaphragm and said means for showing the magnetic property is a magnetic film provided on said diaphragm.

21. The pressure sensor as set forth in claim 19, wherein said displaceable member is a diaphragm and said means for showing the magnetic property is a magnetic material forming at least a part of said diaphragm.

22. A pressure sensor comprising:

a case;

a diaphragm supported by said case at its outer peripheral portion and arranged to displace depending on a pressure differential between two fluids acting on opposite sides thereof; and conversion means for converting said displacement of said diaphragm into an electric signal, said conversion means comprising:

said diaphragm having at least a portion which is magnetic, a ferrite core having a center post and an outer peripheral annular section which cooperatively define therebetween an annular recess, a communication passage formed through said outer peripheral annular section for introducing a monitored pressure into said annular recess therethrough, a coil disposed in said annular recess of said ferrite core and close to said magnetic portion of said diaphragm with a predetermined gap therebetween, said coil changing its inductance depending on a variation in magnitude of said gap, said gap variation caused by said displacement of said diaphragm, and circuit means for feeding a signal in a form of an alternating current to said coil to detect a signal component which has been modulated by said inductance, wherein one opposite side of said diaphragm is exposed to a hermetically sealed chamber and another opposite side of said diaphragm is exposed to said monitored pressure.

* * * * *